US012572462B2

(12) United States Patent
Zhu et al.

(10) Patent No.: US 12,572,462 B2
(45) Date of Patent: Mar. 10, 2026

(54) CONSECUTIVE LOGICAL PAGE ADDRESS SPACE

(71) Applicant: Micron Technology, Inc., Boise, ID (US)

(72) Inventors: Xiaolai Zhu, Shanghai (CN); Huachen Li, Shanghai (CN); Zhuoqi San, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 93 days.

(21) Appl. No.: 18/698,277

(22) PCT Filed: Mar. 14, 2023

(86) PCT No.: PCT/CN2023/081295
§ 371 (c)(1),
(2) Date: Apr. 3, 2024

(87) PCT Pub. No.: WO2024/187368
PCT Pub. Date: Sep. 19, 2024

(65) Prior Publication Data
US 2025/0231869 A1     Jul. 17, 2025

(51) Int. Cl.
*G06F 12/02* (2006.01)
*G06F 12/1009* (2016.01)

(52) U.S. Cl.
CPC ...... *G06F 12/0246* (2013.01); *G06F 12/1009* (2013.01); *G06F 2212/7201* (2013.01)

(58) Field of Classification Search
CPC ............. G06F 12/0246; G06F 12/1009; G06F 2212/7201; G06F 3/061; G06F 3/0638; G06F 3/0688
See application file for complete search history.

(56) References Cited

U.S. PATENT DOCUMENTS

2006/0117162 A1* 6/2006 Sauber ................... G06F 12/10
                                                    711/E12.058
2010/0082917 A1* 4/2010 Yang ................... G06F 12/0607
                                                    711/E12.007
(Continued)

FOREIGN PATENT DOCUMENTS

CN        105786411 A     7/2016

OTHER PUBLICATIONS

"International Search Report and Written Opinion of the International Searching Authority," issued in connection with Int'l Appl. No. PCT/CN23/081295, dated Jul. 6, 2023 (8 pages).

*Primary Examiner* — Sean D Rossiter
(74) *Attorney, Agent, or Firm* — Holland & Hart LLP

(57)        ABSTRACT

Methods, systems, and devices for consecutive logical page address spaces are described. A controller may receive, from a host system, a command including an indication of a logical block address. The controller may determine a logical page address based on the logical block address and may transmit, to a memory device of a set of memory devices, a physical address based on the logical address. In some examples, the address space may be consecutive across virtual pages, planes, memory devices, and pagelines, where a quantity of the set of planes, a quantity of the set of memory devices, or both is not a power of two. In some examples, the address space may be consecutive over a boundary between a first portion of the address space and a second portion of the address space, each associated with memory cells having a respective quantity of virtual pages.

20 Claims, 8 Drawing Sheets

(56) References Cited

U.S. PATENT DOCUMENTS

| | | | |
|---|---|---|---|
| 2011/0087827 A1* | 4/2011 | Yeh | G06F 12/0246 |
| | | | 711/E12.001 |
| 2013/0246721 A1* | 9/2013 | Fukutomi | G06F 3/0679 |
| | | | 711/155 |
| 2017/0220462 A1* | 8/2017 | Tsao | G06F 3/0676 |
| 2022/0171532 A1* | 6/2022 | Kang | G06F 3/064 |

* cited by examiner

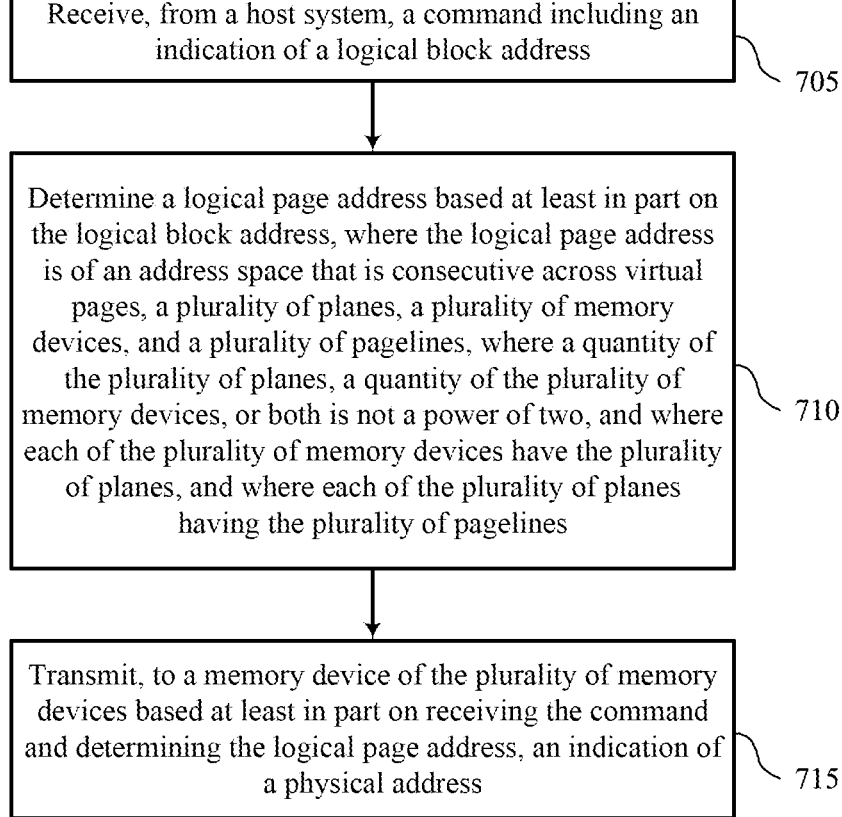

Receive, from a host system, a command including an indication of a logical block address

705

Determine a logical page address based at least in part on the logical block address, where the logical page address is of an address space that is consecutive across virtual pages, a plurality of planes, a plurality of memory devices, and a plurality of pagelines, where a quantity of the plurality of planes, a quantity of the plurality of memory devices, or both is not a power of two, and where each of the plurality of memory devices have the plurality of planes, and where each of the plurality of planes having the plurality of pagelines

710

Transmit, to a memory device of the plurality of memory devices based at least in part on receiving the command and determining the logical page address, an indication of a physical address

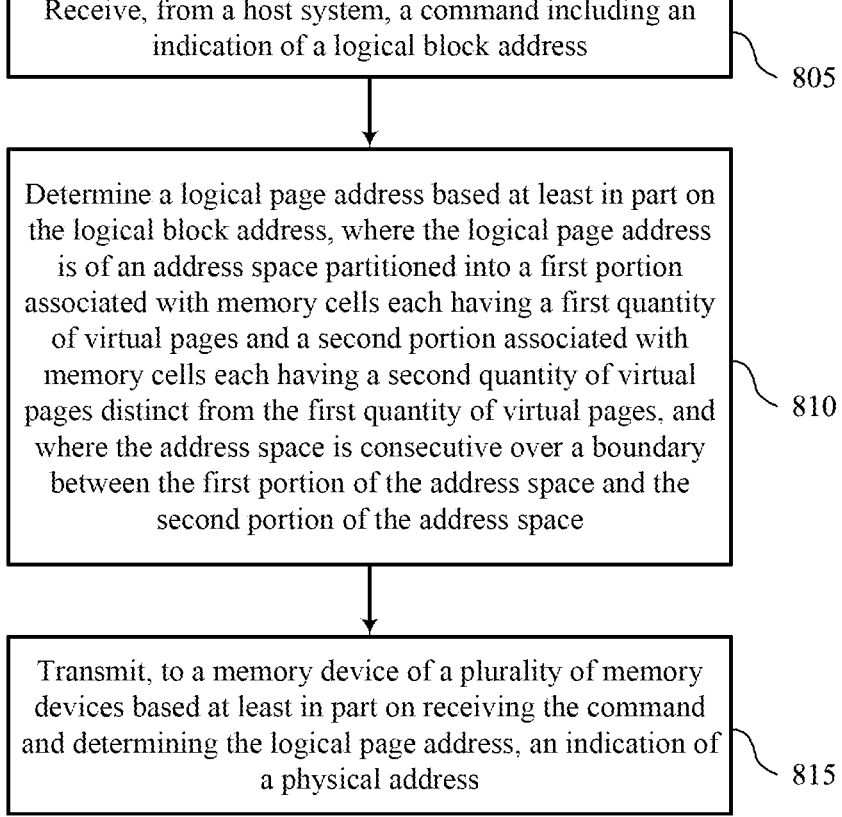

Receive, from a host system, a command including an indication of a logical block address

805

Determine a logical page address based at least in part on the logical block address, where the logical page address is of an address space partitioned into a first portion associated with memory cells each having a first quantity of virtual pages and a second portion associated with memory cells each having a second quantity of virtual pages distinct from the first quantity of virtual pages, and where the address space is consecutive over a boundary between the first portion of the address space and the second portion of the address space

810

Transmit, to a memory device of a plurality of memory devices based at least in part on receiving the command and determining the logical page address, an indication of a physical address

CONSECUTIVE LOGICAL PAGE ADDRESS SPACE

CROSS REFERENCE

The present Application for Patent is a 371 national phase filing of International Patent Application No. PCT/CN2023/081295 by Zhu et al., entitled "CONSECUTIVE LOGICAL PAGE ADDRESS SPACE," filed Mar. 14, 2023, assigned to the assignee hereof, and expressly incorporated by reference in its entirety herein.

TECHNICAL FIELD

The following relates to one or more systems for memory, including consecutive logical page address spaces.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIGS. 7 and 8 show flowcharts illustrating a method or methods that support consecutive logical page address spaces in accordance with examples as disclosed herein.

DETAILED DESCRIPTION

Figure 1:
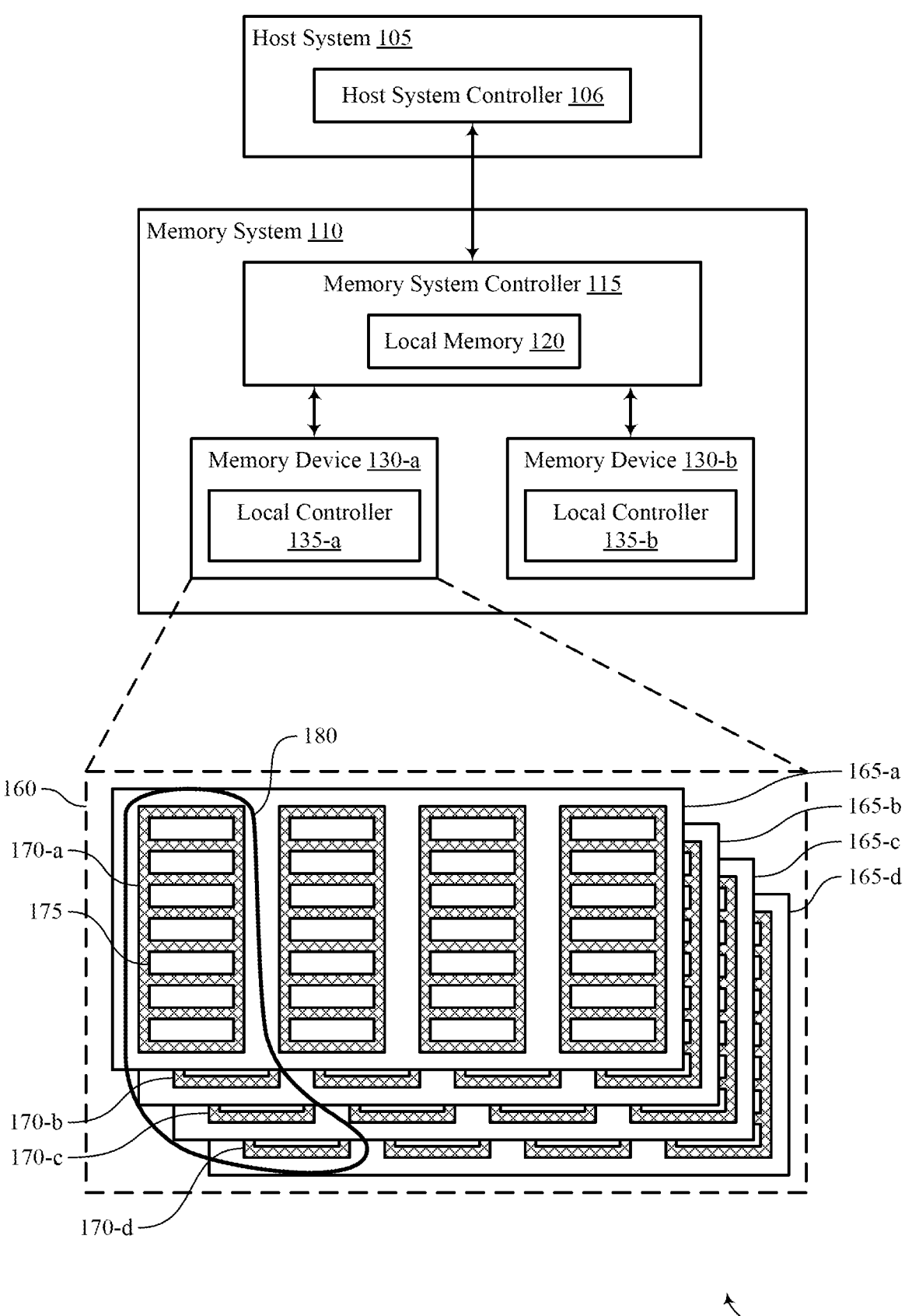
FIG. 1 shows an example of a system that supports consecutive logical page address spaces in accordance with examples as disclosed herein.

In some examples, a memory system may include a controller that may manage translation between logical addresses and physical addresses of memory devices of the memory system. The controller may receive, from a host system, a command indicating a logical block address (LBA). Using the logical block address, the controller may determine a corresponding physical address for a memory device (e.g., a memory die) of a set of memory devices and may transmit an indication of the physical address to the memory device. In some examples, each memory device of the set of memory devices may include a respective set of planes; each plane within the set of planes for a memory device may include a respective set of pagelines; and each pageline within a plane of a memory device may include a respective set of virtual pages (VPs). To determine the physical address, the controller may map the indicated LBA to a physical page address (PPA) using a table, and may derive the physical address from the PPA. In some examples (e.g., when the command is a write command), the controller may use a physical page table (PPT) to aid in determining the PPA. The PPT may reflect, for example, portions of the physical address space that are unused such as portions of the memory devices that are determined to be defective. Each PPA may correspond to a respective physical address of a memory device (e.g., respective subsets of bits of the PPA may correspond to portions of physical addresses for the memory devices).

In some cases, the PPA may include multiple bit fields indicating a specific memory device, plane, pageline, and VP to access. For instance, a first bit field within the PPA may indicate the VP, a second bit field may indicate the plane, a third bit field may indicate the memory device, a fourth bit field may indicate the pageline, and a fifth bit field may indicate a virtual block (VB). In examples in which each of a quantity of pagelines, a quantity of memory devices, a quantity of planes, and a quantity of VPs are equal to a power of two, an address space for the LPA may be consecutive across the pagelines, memory devices, planes, and VPs (e.g., due to each combination of bit fields mapping to a valid pageline, memory device, plane, and VP). In consecutive address spaces, each VP within the address space may either be a beginning or an ending VP for the entire address space or may have an index value within the address space that is immediately subsequent to a VP within the address space and that is immediately preceding a another VP within the address space. However, if any of the pagelines, memory devices, planes, or VPs are not a power of two, then the address space may not be consecutive (e.g., a VP may be present in the address space that is not a beginning or ending VP and that is not immediately subsequent to or immediately preceding another VP within the address space). Additionally or alternatively, if the address space includes multiple regions with varying quantities of virtual pages per region (e.g., a first region has memory cells configured to store a single bit and a second region has memory cells configured to store multiple bits), the resulting address space may not be consecutive at the boundaries between the regions.

The PPT may include individual entries for at least starting PPAs of a set of consecutive PPAs, while each set of consecutive PPAs may be compressed (e.g., a single PPA may be stored to represent a set of consecutive PPAs). A portion of the PPT may be stored in a buffer of the controller, and the buffered portion of the PPT may be flushed to the memory devices upon a total quantity of PPAs stored in the PPT satisfying a threshold value. For example, where a quantity of planes of the memory devices is not a power of two (e.g., six planes), the PPA address space has a discontinuity at each plane transition and addresses across the plane transition are not able to be compressed. However, if the address space is consecutive across planes, the PPT table may include a single PPA for a set of PPAs that span across the planes, which may increase the amount of compression for the PPT. For compression, the PPT may be capable of including information for a greater quantity of PPAs for a given quantity of stored PPAs as compared to scenarios in which the PPAs are uncompressed (e.g., scenarios in which a PPA in the PPT does not refer to other PPAs).

The techniques described herein may enable the address space to be consecutive across memory devices, planes, pagelines, and VPs in examples in which a quantity of memory devices, planes, pagelines, VPs, or any combination thereof is not a power of 2. Additionally or alternatively, the techniques described herein may enable the address space to be consecutive across regions with varying quantities of virtual pages (e.g., regions with memory cells configured to store a single bit along with regions with memory cells configured to store multiple bits). For instance, a single composite bit field may be used to represent the memory device, plane, pageline, and VP to access. The composite bit field may be referred to as a logical page address (LPA). The specific memory device, plane, pageline, and VP to access may be derived from the composite bit field using a set of formulas described herein that preserve the consecutiveness of the address space across the memory devices, planes, pagelines, and VPs. Thus, the only regions of the address space not available for compression may be those that correspond to unused physical address (e.g., due to defective memory cells). Additionally, the set of formulas may account for the boundaries between regions of the address space associated with different quantities of VPs such that the address space remains consecutive. Thus, compression for the PPT may be employed in a greater quantity of situations as compared to examples in which the PPA includes multiple independent bits fields for indicating the memory devices, planes, pagelines, and VPs.

Figure 2:
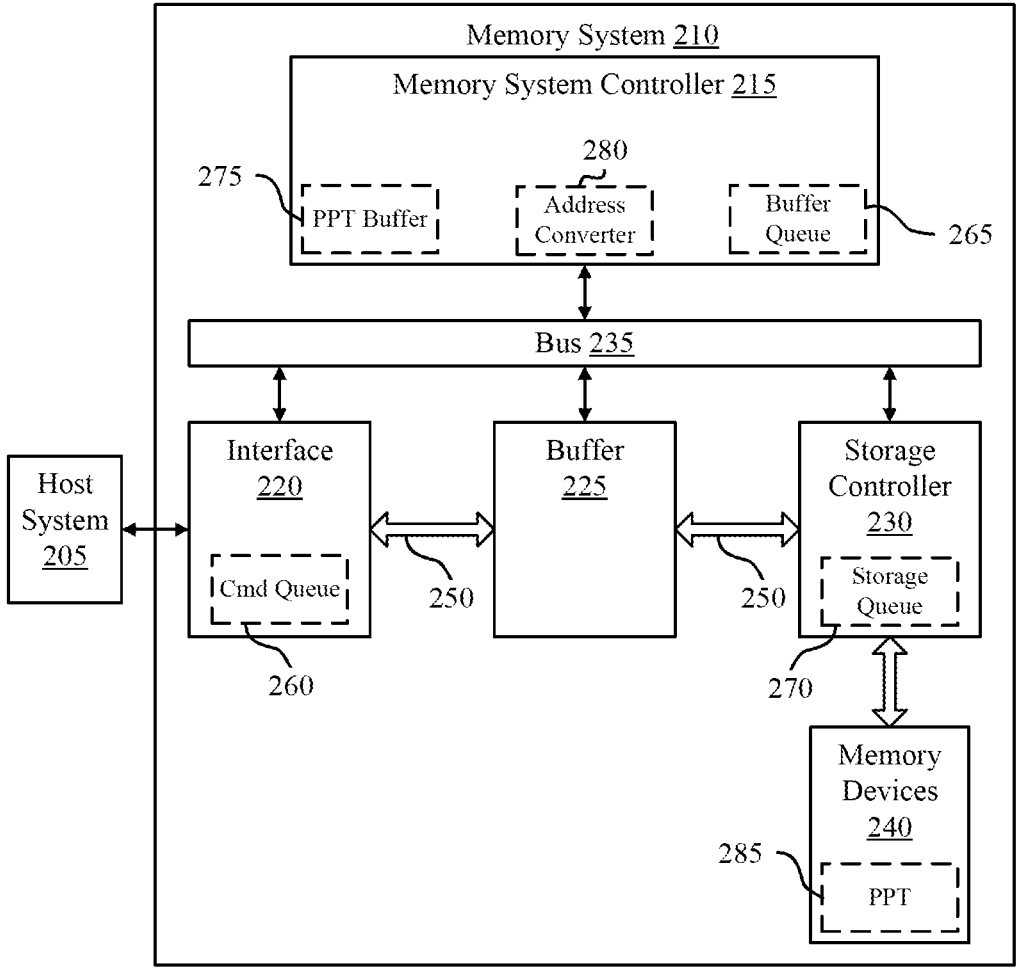
FIG. 2 shows an example of a system that supports consecutive logical page address spaces in accordance with examples as disclosed herein.

Features of the disclosure are initially described in the context of systems, devices, and circuits with reference to FIGS. 1 through 2. Features of the disclosure are described in the context of a PPA compression scheme and an address space with reference to FIGS. 3 through 4. These and other features of the disclosure are further illustrated by and described in the context of an apparatus diagram and flowchart that relate to consecutive logical page address spaces with reference to FIGS. 5 through 8.

FIG. 1 shows an example of a system 100 that supports consecutive logical page address spaces in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support consecutive logical page address spaces. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some examples, a memory system may include a controller (e.g., a memory system controller 115) that may manage translation between logical addresses and physical addresses of memory devices of the memory system. The controller may receive, from a host system, a command indicating an LBA. Using the logical block address, the controller may determine a corresponding physical address for a memory device (e.g., a memory die) of a set of memory devices and may transmit an indication of the physical address to the memory device. In some examples, each memory device of the set of memory devices may include a respective set of planes; each plane within the set of planes for a memory device may include a respective set of pagelines; and each pageline within a plane of a memory device may include a respective set of VPs. To determine the physical address, the controller may map the indicated LBA to a physical page address (PPA) using a table, and may derive the physical address from the PPA. The PPT may reflect, for example, portions of the physical address space that are unused such as portions of the memory devices that are determined to be defective. Each PPA may correspond to a respective physical address of a memory device (e.g., respective subsets of bits of the PPA may correspond to portions of physical addresses for the memory devices). Alternatively, the PPA may be used for mapping an LBA to a PPA. For instance, when the memory system controller 115 receives the command, the memory system controller 115 may identify a PPA in the PPT that corresponds to the LBA and may determine the physical address from the PPA.

In some examples, the PPT may include address mapping information that allows the memory system 110 to map a logical address (e.g., LBA) used by the host system 105 (and associated with access commands) to physical addresses that identify physical memory locations of memory devices (e.g., memory device 130-*a*, 130-*b*). In some examples, the PPT may include or be one of multiple tables, such as table 3 (which may also be referred to a physical page table 3 (PPT3)), table 2 (which may also be referred to as PPT2), and table 1 (which may also be referred to as PPT1) that allow the memory system controller 115 to locate specific address mapping information.

In some examples, PPT1 may include the address mapping information for memory system 110 (e.g., one-to-one logical address to physical address mappings), PPT2 may include information that maps ranges of logical addresses to portions of PPT1, and PPT3 may include information that maps ranges of logical addresses to portions of PPT2. For instance, PPT3 may include x entries, each of which is mapped to a respective y (e.g., 1024) entries in PPT2, and each entry of PPT2 may be mapped to a respective z (e.g., 1024) entries in PPT1. As an example, to determine the address mapping information for a logical address, the controller 115 may first reference PPT3 to find the corresponding entry that points to a set of entries in PPT2, then find the corresponding entry in the set of entries in PPT2 that points to a set of entries in PPT1, then find the corresponding L2P entry in the set of entries in PPT1

In some cases, the PPA may include multiple bit fields indicating a specific memory device, plane, pageline, and VP to access. For instance, a first bit field within the PPA may indicate the VP, a second bit field may indicate the plane (e.g., one of planes 165-*a* through 165-*d*), a third bit field may indicate the memory device (e.g., a memory die, memory device 130-*a*, memory device 130-*b*), a fourth bit field may indicate the pageline, and a fifth bit field may indicate a virtual block (VB). In examples in which each of a quantity of pagelines, a quantity of memory devices, a quantity of planes, and a quantity of VPs are equal to a power of two, an address space for the LPA may be consecutive across the pagelines, memory devices, planes, and VPs (e.g., due to each combination of bit fields mapping to a valid pageline, memory device, plane, and VP). In consecutive address spaces, each VP within the address space may either be a beginning or an ending VP for the entire address space or may have an index value within the address space that is immediately subsequent to a VP within the address space and that is immediately preceding a another VP within the address space. However, if any of the pagelines, memory devices, planes, or VPs are not a power of two, then the address space may not be consecutive (e.g., a VP may be present in the address space that is not a beginning or ending VP and that is not immediately subsequent to or immediately preceding another VP within the address space). Additionally or alternatively, if the address space includes multiple regions with varying quantities of virtual pages per region (e.g., a first region has memory cells configured to store a single bit and a second region has memory cells configured to store multiple bits), the resulting address space may not be consecutive at the boundaries between the regions.

In some examples, a pageline may refer to a single row of pages 175 of a virtual block 180. For example, a pageline corresponding to a first row of a virtual block 180 may include the first page 175 of each block 170 of a group of blocks 170 included in the virtual block 180. In some cases, a virtual block 180 may include virtual pages. For example, the pages 175 may include at least a first quantity of storage (e.g., 16 kilobyte (kB), among other quantities of storage). A virtual page may correspond to a data granularity associated with the type of memory system (e.g., a logical granularity at which data may be written, read, or both). For example, the virtual page may correspond to a second quantity of storage (e.g., 4 kB for UFS and 512 B for eMMC) from which data may be logically read or to which data may be logically written.

A table demonstrating an example of a PPA that is non-consecutive where quantities of die, planes, or VPs are not powers of 2 is provided below:

TABLE 1

| PPA Format | | | | |
|---|---|---|---|---|
| VB (10 bits) | Pageline (12 bits) | Die (2 bits) | Plane (3 bits) | VP (2 bits) |
| 0~567 | 0~2783 | 0~3 | 0~5 | 0~3 |

Table 1 illustrates a PPA that has the first bit field indicating pageline with 12 bits, the second bit field indicating memory die with two bits, the third bit field indicating plane with three bits, and the fourth bit field indicating VP with two bits. As depicted in Table 1, the address space may not be consecutive across planes if there are six planes (planes 0 through 5) but eight possible combinations of the three bits of the corresponding bit field. Accordingly, there may be PPAs with values for the third bit field that do not map to valid VPs and the address space may not be consecutive.

The PPT may include individual entries for at least starting PPAs of a set of consecutive PPAs, while each set of consecutive PPAs may be compressed (e.g., a single PPA may be stored to represent a set of consecutive PPAs). A portion of the PPT may be stored in a buffer of the controller, and the buffered portion of the PPT may be flushed to the memory devices upon a total quantity of PPAs stored in the PPT satisfying a threshold value. For example, where a quantity of planes of the memory devices is not a power of two (e.g., six planes), the PPA address space has a discontinuity at each plane transition and addresses across the plane transition are not able to be compressed. However, if the address space is consecutive across planes, the PPT table may include a single PPA for a set of PPAs that span across the planes, which may increase the amount of compression for the PPT. For compression, the PPT may be capable of including information for a greater quantity of PPAs for a given quantity of stored PPAs as compared to scenarios in which the PPAs are uncompressed (e.g., scenarios in which a PPA in the PPT does not refer to other PPAs).

The techniques described herein may enable the address space to be consecutive across memory devices, planes, pagelines, and VPs in examples in which a quantity of memory devices, planes, pagelines, VPs, or any combination thereof is not a power of 2. Additionally or alternatively, the techniques described herein may enable the address space to be consecutive across regions with varying quantities of virtual pages (e.g., regions with memory cells configured to store a single bit along with regions with memory cells configured to store multiple bits). For instance, a single composite bit field may be used to represent the memory, device, plane, pageline, and VP to access. The composite bit field may be referred to as an LPA. The specific memory device, plane, pageline, and VP to access may be derived from the composite bit field using a set of formulas described herein that preserve the consecutiveness of the address space across the memory devices, planes, pagelines, and VPs. Thus, the only regions of the address space not available for compression may be those that correspond to unused physical address (e.g., due to defective memory cells). Additionally, the set of formulas may account for the boundaries between regions of the address space associated with different quantities of VPs such that the address space remains consecutive. Thus, compression for the PPT may be employed in a greater quantity of situations as compared to examples in which the PPA includes multiple independent bits fields for indicating the memory devices, planes, pagelines, and VPs.

An example format of a consecutive address space for PPAs is provided in the table below:

TABLE 2

| PPA Format | |
|---|---|
| VB 10 bits | LPA 18 bits (pageline, die, plane, VP) |
| 0~XXX | 0~534527 |

Table 2 illustrates a PPA that has a single composite bit field for the LPA (e.g., a bit field of 18 bits) It should be noted that the terms are exemplary (e.g., 18 bits, 534528 available LPA addresses) and that other terms may be used without deviating from the scope of the disclosure.

In addition to applicability in memory systems as described herein, techniques for consecutive logical page address spaces may be generally implemented to improve the performance (including gaming) of various electronic devices and systems. Some electronic device applications, including gaming and other high-performance applications, may be associated with relatively high processing constraints while also benefitting from relatively quick response times to improve user experience. As such, increasing processing speed, decreasing response times, or otherwise improving the performance electronic devices may be desirable. Implementing the techniques described herein may improve the performance of electronic devices by decreasing a frequency of PPT flushing transactions, which may increase availability for performing other operations, among other benefits.

FIG. 2 shows an example of a system 200 that supports consecutive logical page address spaces in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) in examples in which the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

After the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, address translations between logical addresses (e.g., LBAs) associated with commands from the host system 205 and PPAs, and address translations between physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some examples, memory system controller 215 may include an address converter 280 that is configured to convert an LBA to a physical address (e.g., a backend address as described herein). For instance, the address converter 280 may map the LBA to PPA (e.g., using an logical address to physical address (L2P) table, the PPT) and may extract an LPA from the PPA. The address converter 280 may derive a specific memory device (e.g., of the memory devices 240), plane, pageline, and VP from the LPA using the set of formulas described herein. The set of formulas may preserve the consecutiveness of the address space across memory devices, planes, pagelines, and VPs that are not a power of two (e.g., along with those that are powers of two) and/or may preserve the consecutiveness of the address space across regions (e.g., across a boundary of a first region with memory cells configured to store a first quantity of VPs and a second region configured to store a second quantity of VPs). Additionally, the address converter 280 may convert from a physical address to an LPA based on a second set of formulas. In some examples, memory system controller 215 may include a PPT buffer 275 configured to hold PPAs to store in the PPT 285. In examples in which a threshold quantity of PPAs in the PPT buffer 275 is above a threshold amount, the PPT buffer 275 may be flushed and the PPAs may be stored in PPT 285.

Figure 3:
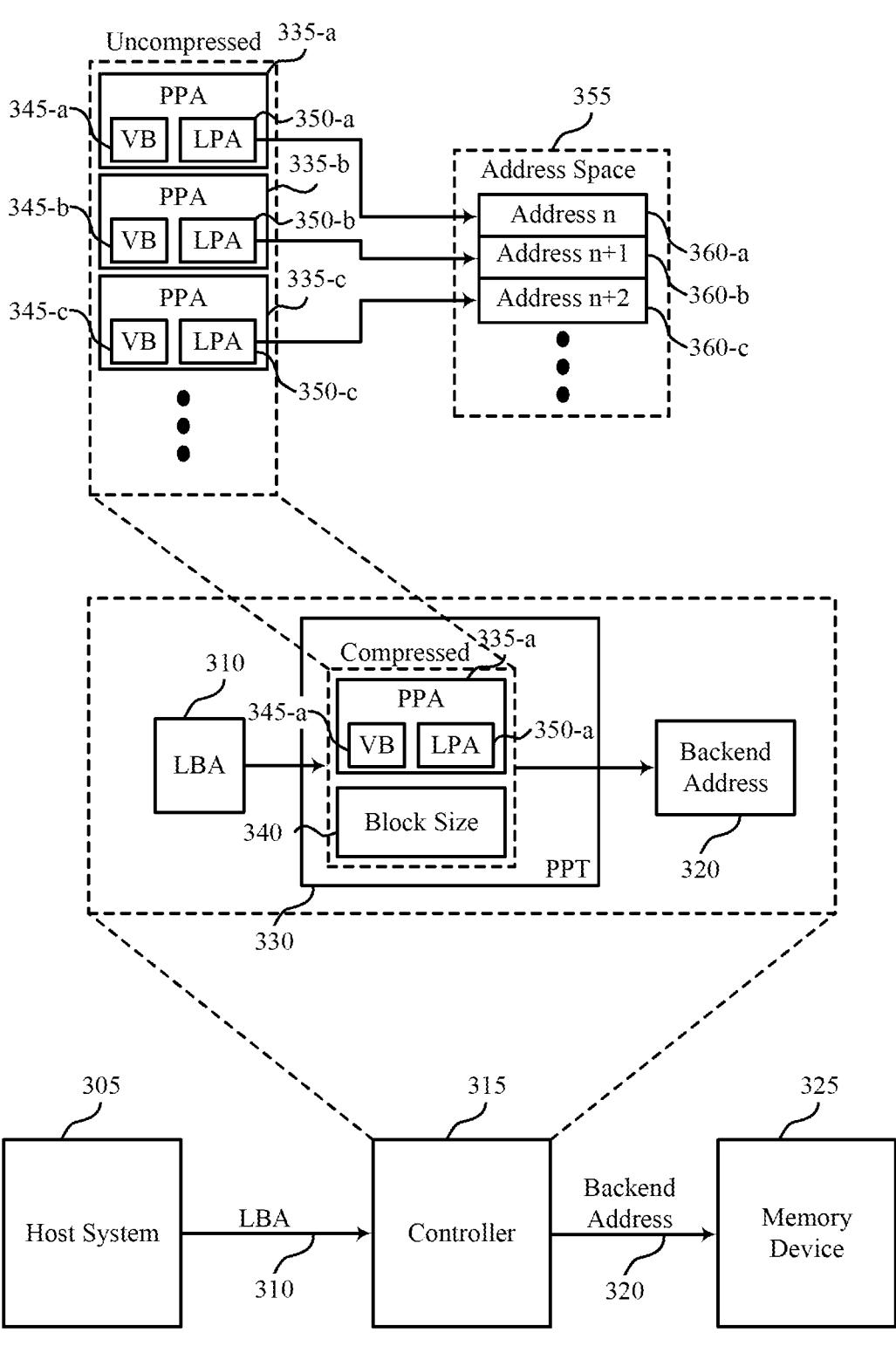
FIG. 3 shows an example of a physical page address (PPA) compression scheme that supports consecutive logical page address spaces in accordance with examples as disclosed herein.

FIG. 3 shows an example of a PPA compression scheme 300 that supports consecutive logical page address spaces in accordance with examples as disclosed herein. In some examples, PPA compression scheme 300 may implement or be implemented by one or more aspects of systems 100 and/or 200. For instance, host system 305 may be an example of a host system 105 as described with reference to FIG. 1. Additionally or alternatively, controller 315 may be an example of a memory system controller 115 as described with reference to FIG. 1 and/or a memory system controller 215 as described with reference to FIG. 2. Additionally or alternatively, memory device 325 may be an example of memory device 130-*a* or memory device 130-*b* as described with reference to FIG. 1 and/or one of memory devices 240 as described with reference to FIG. 2.

In some examples, controller 315 may receive, from host system 305, a command indicating LBA 310. Using the LBA, controller 315 may determine a corresponding back-end address 320 (e.g., a physical address) for memory device 325, which may be one memory device of a set of memory devices. In some examples, controller 315 may map the LBA 310 to a PPA 335-*a* (e.g., using an L2P table) and may store the PPA 335-*a* in PPT 330. PPA 335-*a* may include a virtual block 345-*a* and an LPA 350-*a*. Using a formula as described herein, the controller 315 may derive backend address 320 (e.g., a physical address) from LPA 350-*a*. In some examples, PPA 335-*a* may represent a compressed set of PPAs. For instance, the compressed set of PPAs may include PPAs 335-*a*, 335-*b*, and 335-*c*. PPA 335-*b* may include virtual block 345-*b* and LPA 350-*b* and PPA 335-*c* may include virtual block 345-*c* and LPA 350-*c*. In some examples, each of the PPAs in the compressed set of PPAs may map to addresses in the address space 355 that are immediately subsequent or preceding an address of another PPA in the compressed set of PPAs. For instance, LPA 350-*a* may map to address 360-*a* which may have index n and may be immediately consecutive to address 360-*b* which may map to LPA 350-*b* and may have index n+1. Additionally, LPA 350-*c* may map to address 360-*c* which may have an index n+2 and may be immediately consecutive to address 360-*b* in the address space 355.

In some examples, address 360-*b* may map to a different VP in a same pageline as address 360-*a*; may map to a different VP in a different pageline but a same plane (e.g., one of the pagelines may be immediately subsequent to the other); may map to a different VP in a different pageline and a different plane but a same memory die (e.g., one of the planes may be immediately subsequent to the other); or may map to a different VP in a different pageline, plane, and memory die, but may correspond to a page in the different memory die that is consecutive with the address in the original memory die. In some examples, address 360-*a* may be consecutive with address 360-*b* even if they are associated with separate memory dies of a set of memory dies or separate planes of a set of planes that have a quantity not of a power of two. For instance, in a first example, if there are 6 planes and 3 memory dies and address 360-*a* is associated with a last VP of a memory die of index 0 and a plane of index 6 and address 360-*b* is associated with a beginning VP of a memory die of index 1 and a plane of index 0, then address 360-*b* may be indexed to be immediately adjacent to address 360-*a* in examples in which address 360-*a* and 360-*b* are associated with the same pageline. In a second example, if there are 6 planes and 3 memory dies and address 360-*a* is associated with a last VP of a memory die of index 2, a plane of index 6, and a pageline of index n and address 360-*b* is associated with a beginning VP of a memory die of index 0, a plane of index 0, and a pageline of index n+1, then address 360-*b* may be indexed to be immediately adjacent to address 360-*a* in at least some examples. Additionally or alternatively, address 360-*a* may be in a different region (e.g., a region of memory cells configured to store a first quantity of bits) as compared to address 360-*b* (e.g., a region of memory cells configured to store a second quantity of bits). It should be noted that the relationship of addresses 360-*a* and 360-*b* is exemplary and that the same relationship may apply for any two addresses with indices next to each other in the address space 355 (e.g., address 360-*b* and 360-*c*, address 360-*c* and another address). In some examples, a block size 340 may be included with the compressed set of PPAs. For instance, block size 340 may indicate how many PPAs are included in the compressed set of PPAs and/or may indicate a total size of a memory block spanned by the compressed set of PPAs.

As described herein, LPA 350-*a* may include a single composite bit field indicating a specific memory device, plane, pageline, and VP to access and may map to an address space 355 consecutive across memory dies, planes, pagelines, and VPs, even if a quantity of memory dies, quantity of planes, quantity of pagelines, or quantity of VPs covered by the address space 355 is not a power of two. In examples in which the address space 355 is consecutive, each VP within the address space may either be a beginning or an ending VP for the entire address space 355 or may have an index value within the address space 355 that is immediately subsequent to a respective first VP within the address space 355 and that is immediately preceding a respective second VP within the address space 355. Similarly, the single bit field may be consecutive across regions of address space of varying quantities of VPs (e.g., a first region with memory cells configured to store a first quantity of bits and a second region with memory cells configured to store a second quantity of bits). Additional details are described herein, for instance, with reference to FIG. 4.

In some examples, controller 315 may apply a function to convert LPA to other parameters. For instance, to convert a PPA with an LPA to a physical address, the LPA may use the following set of formulas:

$$VB = (PPA \gg 20) \,\&\, 0x3FF \qquad (1)$$

$$VP = (PPA \,\&\, 0xFFFFF) \% \text{ TU\_Per\_Plane} \qquad (2)$$

$$\text{Plane} = \frac{(PPA \,\&\, 0xFFFFF)}{\text{TU\_Per\_Plane}} \% \text{ Plane\_Per\_Die} \qquad (3)$$

$$\text{Die} = \qquad (4)$$

$$\left( \left( \frac{(PPA \,\&\, 0xFFFFF) - PageTypeChangePointX}{\begin{array}{c}(\text{TU\_Per\_Plane} * \text{Plane\_Per\_Die} * \\ \text{Die\_counter\_Prog} * PageTypeNumberX)\end{array}} \% \left( \frac{\text{Die\_counter}}{\text{Die\_counter\_Prog}} \right) \right) * \right.$$

$$\text{Die\_counter\_Prog} +$$

$$\left. \frac{(LPA \,\&\, 0xFFFFF)}{(\text{TU\_Per\_Plane} * \text{Plane\_Per\_Die})} \% \text{ Die\_counter\_Prog} \right)$$

$$PageLUX = \frac{(PPA \,\&\, 0xFFFF) - \begin{array}{c}PageTypeChangePointX\end{array}}{\begin{array}{c}(\text{TU\_Per\_Plane} * \text{Plane\_Per\_Die} * \\ \text{Die\_counter\_Prog})\end{array}} \% (PageTypeNumberX) \qquad (5)$$

$$PageIndex = \qquad (6)$$

$$\left( \frac{((PA \,\&\, 0xFFFFF) - PageTypeChangePointX)}{\begin{array}{c}\text{TU\_Per\_Plane} * \text{Plane\_Per\_Die} * \text{Die\_counter\_Prog} * \\ PageTypeNumberX * \left( \frac{\text{Die\_counter}}{\text{Die\_counter\_Prog}} \right)\end{array}} \right) + PageIndexX$$

$$Pageline = PagelineX + \qquad (7)$$

$$(PageIndex - PageIndexX) * PageTypeNumberX + PageLUX$$

In some examples, may represent a right bit shift, & may represent a bitwise AND, and % may represent a modulo operation. In some examples, VB may represent an index of a virtual block, VP may represent an index of a virtual page, Plane may represent an index of a plane, Die may represent an index of a memory device (e.g., a memory die, memory device 325), PageLUX may represent whether an index corresponding to a type of page (e.g., a first value for a lower page, a second value for an upper page, and a third value for an extra page), PageIndex may represent an index of a page, and Pageline may represent an index of a pageline. In some examples, multiple pagelines may have the same associated PageIndex but a different PageLUX (e.g., in examples in which memory cells associated with a page index are each configured to store multiple bits). In some examples, TU_Per_Plane may be a quantity of virtual pages per plane and Plane_Per_Die may be a quantity of planes per memory device. In some examples, Die_counter_Prog may represent a quantity of programmable memory dies that are grouped together and Die_Counter may be a total quantity of memory dies. For instance, if there are 8 memory dies grouped together in groups of 4, then Die_Counter=8 and Die_counter_Prog=4. In some examples, PageTypeChangePointX may represent an index of a boundary of the address space between addresses associated with memory cells configured to store a first quantity of VPs or bits and addresses associated with memory cells configured to store a second quantity of VPs or bits. In some examples, PageTypeNumberX may be a total quantity of page types. For instance, if a page can be a lower page, an upper page, or an extra page, then PageTypeNumberX=3. In some examples, PageIndexX may represent a page index for the boundary pointed to by PageTypeChangePointX.

In some examples, the controller 315 applying the function may be based on an index of a boundary of the address space (e.g., PageTypeNumberX). For instance, equations (4)-(7) may be utilized if PageTypeChangePointX≤(LPA & 0xFFFFF). Additionally, equations (4)-(7) may be utilized if (LPA & 0xFFFFF)<PageTypeChangePointY, where PageTypeChangePointY may represent an index of a second boundary of the address space between memory cells configured to store the second quantity of VPs and memory cells configured to store a third quantity of VPs (e.g., the first quantity of VPs may equal the third quantity of VPs). When (LPA & 0xFFFFF)<PageTypeChangePointX or (LPA & 0xFFFFF)>PageTypeChangePointY, other formulas may be employed. A person having ordinary skill in the art may derive such other formulas using equations (4)-(7) (e.g., such formulas may have a similar form). In some examples, PageindexY may represent a page index for the boundary pointed to by PageTypeChangePointY.

In some examples, controller 315 may apply a function (e.g., equations (1) through (7)) to convert LPA to other parameters (e.g., In some examples, to convert a physical address to an LPA, (e.g., in examples in which PageIndexX≤PageIndex<PageIndexY) the following equation may be used:

$$LPA = (VB \ll 20) + PageTypeChangePointX + \qquad (8)$$

$$((PageIndex - PageIndexX) * PageTypeNumberX) *$$

$$(\text{TU\_Per\_Plane} * \text{Plane\_per\_Die} * \text{Die\_Counter}) +$$

-continued $$\left( PageTypeNumberX * \left( \frac{Die}{Die\_counter\_Prog} \right) + PageLUX \right) *$$

$$(Tu\_Per\_Plane * Plane\_Per\_Die * Die\_counter\_Prog) +$$

$$(Die \% Die\ counter\ Prog) * Plane\ Per\ Die * TU\ Per\ Plane + VP;$$

The tables below may provide an example of the set of formula being employed over 8 memory dies (e.g., 8 memory devices), where each memory die has 4 planes, where each plane has at least 3 pagelines (marked as Page<n> in the table), and each pageline has 4 virtual pages.

The techniques described herein may enable compression for PPT tables to be employed in a greater quantity of cases as compared to examples in which the LPA includes multiple bit fields. For instance, the techniques may enable compression to be performed even if a quantity of memory devices or planes per memory device is not a power of two and/or even if a boundary between regions of memory cells is present (e.g., between a first region with memory cells configured to store a first quantity of bits and a second region with memory cells configured to store a second quantity of bits). In general, compression may enable PPT flushing to be

TABLE 3A

| | Die0 | | | | Die1 | | | |
|---|---|---|---|---|---|---|---|---|
| Page<n> | Plane 0 | Plane 1 | Plane 2 | Plane 3 | Plane 0 | Plane 1 | Plane 2 | Plane 3 |
| n | X + 4*0 | X + 4*1 | X + 4*2 | X + 4*3 | X + 4*4 | X + 4*5 | X + 4*6 | X + 4*7 |
| n + 1 | X + 4*16 | X + 4*17 | X + 4*18 | X + 4*19 | X + 4*20 | X + 4*21 | X + 4*22 | X + 4*23 |
| n + 2 | X + 4*32 | X + 4*33 | X + 4*34 | X + 4*35 | X + 4*36 | X + 4*37 | X + 4*38 | X + 4*39 |

LPA Values For Memory Dies 0 and 1

TABLE 3B

| | Die0 | | | | Die1 | | | |
|---|---|---|---|---|---|---|---|---|
| Page<n> | Plane 0 | Plane 1 | Plane 2 | Plane 3 | Plane 0 | Plane 1 | Plane 2 | Plane 3 |
| n | X + 4*8 | X + 4*9 | X + 4*10 | X + 4*11 | X + 4*12 | X + 4*13 | X + 4*14 | X + 4*15 |
| n + 1 | X + 4*16 | X + 4*17 | X + 4*18 | X + 4*19 | X + 4*20 | X + 4*21 | X + 4*22 | X + 4*23 |
| n + 2 | X + 4*32 | X + 4*33 | X + 4*34 | X + 4*35 | X + 4*36 | X + 4*37 | X + 4*38 | X + 4*39 |

LPA Values For Memory Dies 2 and 3

TABLE 3C

| | Die0 | | | | Die1 | | | |
|---|---|---|---|---|---|---|---|---|
| Page<n> | Plane 0 | Plane 1 | Plane 2 | Plane 3 | Plane 0 | Plane 1 | Plane 2 | Plane 3 |
| n | X + 4*48 | X + 4*49 | X + 4*50 | X + 4*51 | X + 4*52 | X + 4*53 | X + 4*54 | X + 4*55 |
| n + 1 | X + 4*64 | X + 4*65 | X + 4*66 | X + 4*67 | X + 4*68 | X + 4*69 | X + 4*70 | X + 4*71 |
| n + 2 | X + 4*80 | X + 4*81 | X + 4*82 | X + 4*83 | X + 4*84 | X + 4*85 | X + 4*36 | X + 4*87 |

LPA Values For Memory Dies 4 and 5

TABLE 3D

| | Die0 | | | | Die1 | | | |
|---|---|---|---|---|---|---|---|---|
| Page<n> | Plane 0 | Plane 1 | Plane 2 | Plane 3 | Plane 0 | Plane 1 | Plane 2 | Plane 3 |
| n | X + 4*56 | X + 4*57 | X + 4*58 | X + 4*59 | X + 4*60 | X + 4*61 | X + 4*62 | X + 4*63 |
| n + 1 | X + 4*72 | X + 4*73 | X + 4*74 | X + 4*75 | X + 4*76 | X + 4*77 | X + 4*78 | X + 4*79 |
| n + 2 | X + 4*88 | X + 4*89 | X + 4*90 | X + 4*91 | X + 4*92 | X + 4*93 | X + 4*94 | X + 4*95 |

LPA Values For Memory Dies 6 and 7

In the tables above, TU_Per_Plane=4, Plane_Per_Die=4, Die_Counter=8, and Die_counter_Prog=4. Additionally, X may represent a baseline LPA value for pageline n at a beginning VP of plane 0 in die 0. The 4 in each entry of the table may correspond to TU_Per_Plane, which may equal 4 in this example. However, TU_Per_Plane may have other values.

performed less frequently and fewer PPAs may be stored in the PPT for a given quantity of PPAs. Thus, the efficiency of the PPT may be increased.

Figure 4:
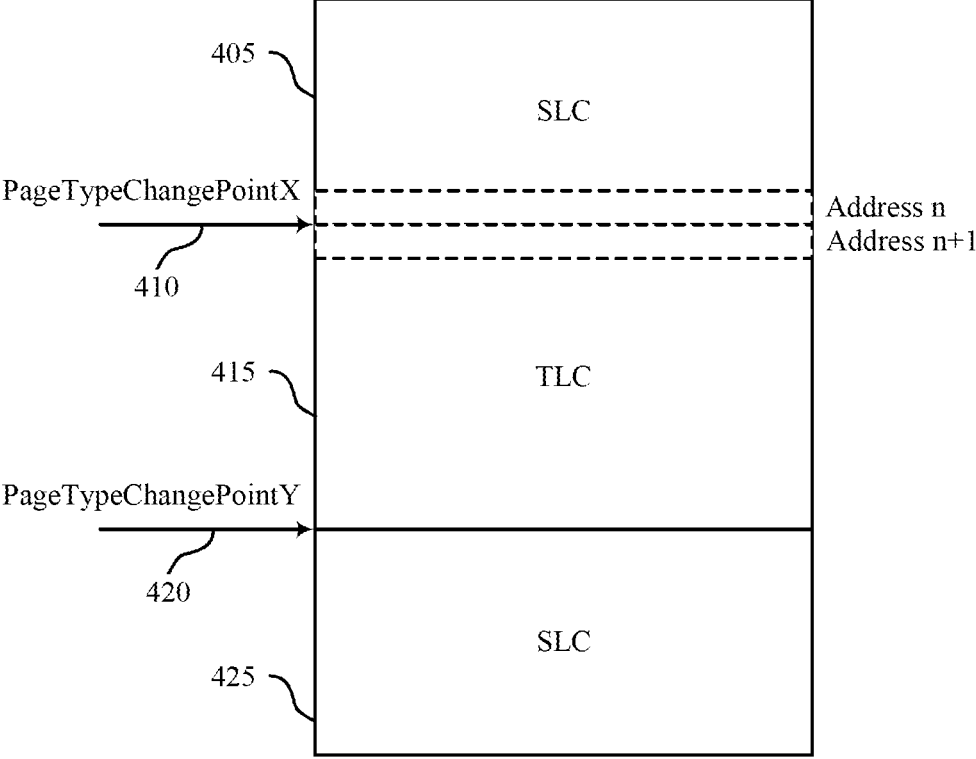
FIG. 4 shows an example of an address space that supports consecutive logical page address spaces in accordance with examples as disclosed herein.

FIG. 4 shows an example of an address space 400 that supports consecutive logical page address spaces in accordance with examples as disclosed herein. In some examples, address space 400 may be implemented by one or more aspects of PPA compression scheme 300. For instance, address space 400 may represent an address space 355 as described with reference to FIG. 3.

In some examples, address space 400 may be partitioned into regions. For instance, address space 400 may include a first region 405 and a third region 425 whose addresses are associated with memory cells configured to store a single bit (e.g., single level cells (SLCs)). Additionally, address space 400 may include a second region 415 whose addresses are associated with memory cells configured to store multiple bits (e.g., triple-level cells (TLCs)). It should be noted that the memory cells for first region 405, second region 415, and third region 425 as described herein are exemplary and may be configured to store other quantities of bits without deviating from the scope of the present disclosure (e.g., region 405 and/or 425 may include multi-level cells (MLCs), TLCs, or quad-level cells (QLCs) and/or region 415 may include SLCs, MLCs, or QLCs).

In some examples, a pointer 410 (e.g., PageTypeChangePointX) may point to a boundary between first region 405 and second region 415. Similarly, a pointer 420 (e.g., PageTypeChangePointY) may point to boundary between second region 415 and third region 425. As described herein, pointer 410 and pointer 420 may be used in equations (4) through (8) to maintain the consecutiveness of address space 400. For instance, pointer 410 may be used to maintain consecutiveness between a VP associated with address n in first region 405 associated with an SLC memory cell and a VP associated with address n+1 in second region 415 associated with a TLC memory cell. For instance, a VP for address n may have an index immediately preceding or subsequent to a VP for address n+1.

Figure 5:
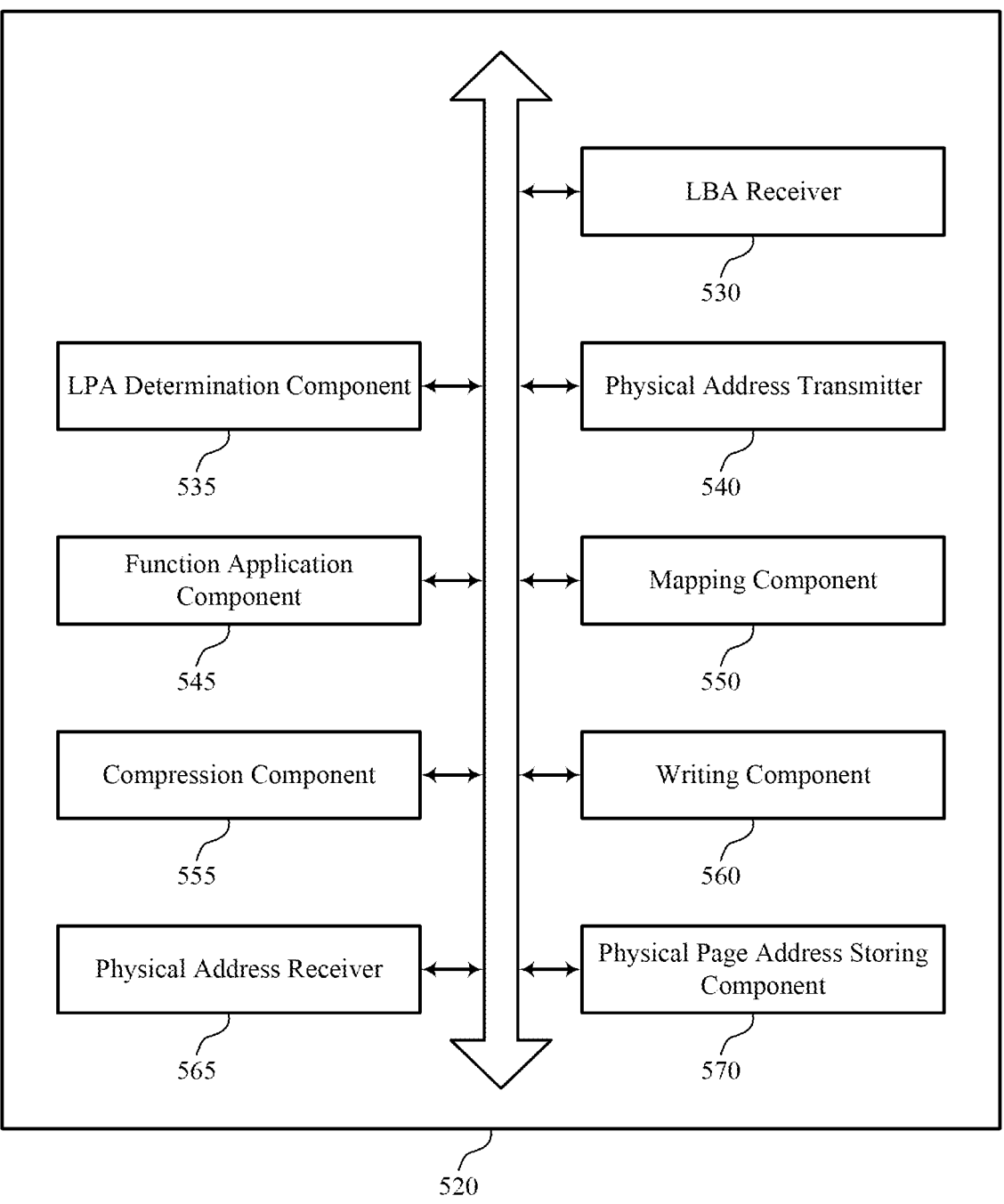
FIG. 5 shows a block diagram of a controller that supports consecutive logical page address spaces in accordance with examples as disclosed herein.

FIG. 5 shows a block diagram 500 of a controller 520 that supports consecutive logical page address spaces in accordance with examples as disclosed herein. The controller 520 may be an example of aspects of a controller as described with reference to FIGS. 1 through 4. The controller 520, or various components thereof, may be an example of means for performing various aspects of consecutive logical page address spaces as described herein. For example, the controller 520 may include an LBA receiver 530, an LPA determination component 535, a physical address transmitter 540, a function application component 545, a mapping component 550, a compression component 555, a writing component 560, a physical address receiver 565, a physical page address storing component 570, or any combination thereof. Each of these components may communicate, directly or indirectly, with one another (e.g., via one or more buses).

In some examples, the address space being consecutive across virtual pages, the plurality of planes, the plurality of memory devices, and the plurality of pagelines includes each virtual page of the address space having an index value immediately subsequent to a respective first virtual page of the address space and immediately preceding a respective second virtual page of the address space, or being a beginning virtual page in an ordering spanning the address space or an ending virtual page in the ordering spanning the address space.

In some examples, for each virtual page of the address space, the respective first virtual page or the respective second virtual page are each of a same plane as the virtual page, of a different plane for a same memory die as the virtual page, of a different plane for a different memory device for a same pageline as the virtual page, or of a different plane for a different memory device for a different pageline from the virtual page.

In some examples, map the logical block address to a physical page address, where the physical page address includes the logical page address.

The LBA receiver 530 may be configured as or otherwise support a means for receiving, from a host system, a command including an indication of a logical block address. The LPA determination component 535 may be configured as or otherwise support a means for determining a logical page address based at least in part on the logical block address, where the logical page address is of an address space that is consecutive across virtual pages, a plurality of planes, a plurality of memory devices, and a plurality of pagelines, where a quantity of the plurality of planes, a quantity of the plurality of memory devices, or both is not a power of two, and where each of the plurality of memory devices have the plurality of planes, and where each of the plurality of planes having the plurality of pagelines. The physical address transmitter 540 may be configured as or otherwise support a means for transmitting, to a memory device of the plurality of memory devices based at least in part on receiving the command and determining the logical page address, an indication of a physical address.

In some examples, the function application component 545 may be configured as or otherwise support a means for applying a first function to the logical page address to generate the physical address, where the indication of the physical address is transmitted based at least in part on applying the first function.

In some examples, the physical address receiver 565 may be configured as or otherwise support a means for receiving, from the memory device or another memory device of the plurality of memory devices, a second physical address. In some examples, the function application component 545 may be configured as or otherwise support a means for applying a second function to the second physical address to generate a second logical page address of the address space.

In some examples, the address space being consecutive across virtual pages, the plurality of planes, the plurality of memory devices, and the plurality of pagelines includes each virtual page of the address space having an index value immediately subsequent to a respective first virtual page of the address space and immediately preceding a respective second virtual page of the address space, or being a beginning virtual page in an ordering spanning the address space or an ending virtual page in the ordering spanning the address space.

In some examples, for each virtual page of the address space, the respective first virtual page or the respective second virtual page are each of a same plane as the virtual page, of a different plane for a same memory die as the virtual page, of a different plane for a different memory device for a same pageline as the virtual page, or of a different plane for a different memory device for a different pageline from the virtual page.

In some examples, the mapping component 550 may be configured as or otherwise support a means for mapping the logical block address to a physical page address, where the physical page address includes the logical page address.

In some examples, the physical page address storing component 570 may be configured as or otherwise support a means for storing a value of the physical page address including the logical page address in a logical to physical address table.

In some examples, the compression component 555 may be configured as or otherwise support a means for compressing a set of physical page addresses in a physical page table, where the set of physical page addresses includes a set of respective logical page addresses, and where at least one logical page address of the set of respective logical page addresses maps to a first memory device of the plurality of memory devices, a first plane of the plurality of planes, or both and at least one other logical page address of the set of respective logical page addresses maps to a second memory device of the plurality of memory devices and distinct from the first memory device, a second plane of the plurality of planes and distinct from the first plane, or both.

In some examples, the quantity of the plurality of memory devices is equal to eight and the quantity of the plurality of planes is equal to six, and the writing component 560 may be configured as or otherwise support a means for writing over 128 megabytes of data to one or more of the plurality of memory devices based at least in part on a plurality of commands associated with a plurality of logical block address. In some examples, the quantity of the plurality of memory devices is equal to eight and the quantity of the plurality of planes is equal to six, and the compression component 555 may be configured as or otherwise support a means for compressing a portion of a physical page table associated with a plurality of physical page addresses corresponding to the over 128 megabytes of data based at least in part on the address space being consecutive across the virtual pages, the plurality of planes, the plurality of memory devices, and the plurality of pagelines.

In some examples, each of the plurality of memory devices is a NOT-AND (NAND) memory device.

Figure 6:
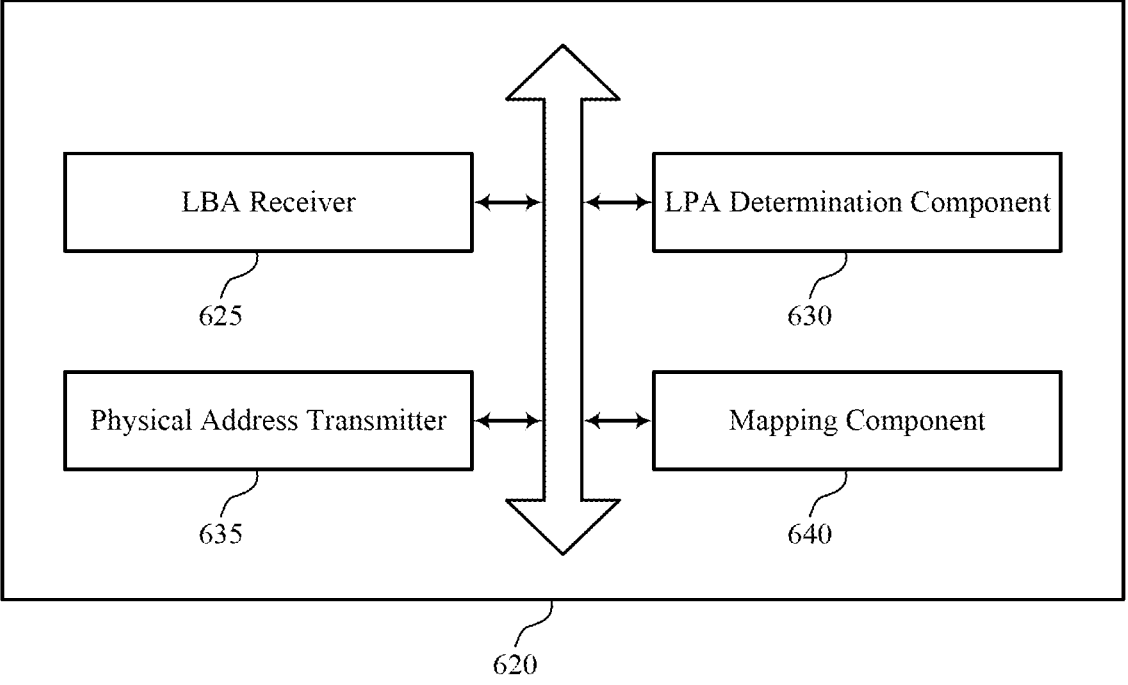
FIG. 6 shows a block diagram of a controller that supports consecutive logical page address spaces in accordance with examples as disclosed herein.
Figure 6:
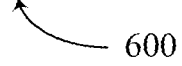

FIG. 6 shows a block diagram 600 of a controller 620 that supports consecutive logical page address spaces in accordance with examples as disclosed herein. The controller 620 may be an example of aspects of a controller as described with reference to FIGS. 1 through 4. The controller 620, or various components thereof, may be an example of means for performing various aspects of consecutive logical page address spaces as described herein. For example, the controller 620 may include an LBA receiver 625, an LPA determination component 630, a physical address transmitter 635, a mapping component 640, or any combination thereof. Each of these components may communicate, directly or indirectly, with one another (e.g., via one or more buses).

The LBA receiver 625 may be configured as or otherwise support a means for receiving, from a host system, a command including an indication of a logical block address. The LPA determination component 630 may be configured as or otherwise support a means for determining a logical page address based at least in part on the logical block address, where the logical page address is of an address space partitioned into a first portion associated with memory cells each having a first quantity of virtual pages and a second portion associated with memory cells each having a second quantity of virtual pages distinct from the first quantity of virtual pages, and where the address space is consecutive over a boundary between the first portion of the address space and the second portion of the address space. The physical address transmitter 635 may be configured as or otherwise support a means for transmitting, to a memory device of a plurality of memory devices based at least in part on receiving the command and determining the logical page address, an indication of a physical address.

In some examples, the address space is further partitioned into a third portion associated with memory cells having a third quantity of virtual pages distinct from the second quantity of virtual pages. In some examples, the address space is consecutive over a second boundary between the second portion of the address space and the third portion of the address space.

In some examples, the first quantity is the same as the third quantity.

In some examples, the address space being consecutive over the boundary includes a first logical page address corresponding to a first virtual page in the first portion of the address space having a value immediately preceding a second logical page address corresponding to a second virtual page in the second portion of the address space.

In some examples, the mapping component 640 may be configured as or otherwise support a means for mapping the logical block address to a physical page address, where the physical page address includes the logical page address.

In some examples, each of the plurality of memory devices is a NOT-AND (NAND) memory device.

FIG. 7 shows a flowchart illustrating a process 700 that supports consecutive logical page address spaces in accordance with examples as disclosed herein. The operations of process 700 may be implemented by a controller or its components as described herein. For example, the operations of process 700 may be performed by a controller as described: with reference to FIGS. 1 through 5. In some examples, a controller may execute a set of instructions to control the functional elements of the device to perform the described functions. Additionally, or alternatively, the wireless controller may perform aspects of the described functions using special-purpose hardware. Aspects of the process 700 may be implemented by a controller among other components. Additionally or alternatively, aspects of the process 700 may be implemented as instructions stored in memory (e.g., firmware stored in a memory coupled with memory system controller 115 and/or memory system controller 215). For example, the instructions, in examples in which the instructions are executed by a controller (e.g., the memory system controller 115 and/or memory system controller 215), may cause the controller to perform the operations of the process 700.

At 705, the method may include receiving, from a host system, a command including an indication of a logical block address. The operations of 705 may be performed in accordance with examples as disclosed herein. In some examples, aspects of the operations of 705 may be performed by an LBA receiver 530 as described with reference to FIG. 5.

At 710, the method may include determining a logical page address based at least in part on the logical block address, where the logical page address is of an address space that is consecutive across virtual pages, a plurality of planes, a plurality of memory devices, and a plurality of pagelines, where a quantity of the plurality of planes, a quantity of the plurality of memory devices, or both is not a power of two, and where each of the plurality of memory devices have the plurality of planes, and where each of the plurality of planes having the plurality of pagelines. The operations of 710 may be performed in accordance with examples as disclosed herein. In some examples, aspects of the operations of 710 may be performed by an LPA determination component 535 as described with reference to FIG. 5.

At 715, the method may include transmitting, to a memory device of the plurality of memory devices based at least in part on receiving the command and determining the logical page address, an indication of a physical address. The operations of 715 may be performed in accordance with examples as disclosed herein. In some examples, aspects of the operations of 715 may be performed by a physical address transmitter 540 as described with reference to FIG. 5.

In some examples, an apparatus as described herein may perform a method or methods, such as the process 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, from a host system, a command including an indication of a logical block address; determining a logical page address based at least in part on the logical block address, where the logical page address is of an address space that is consecutive across virtual pages, a plurality of planes, a plurality of memory devices, and a plurality of pagelines, where a quantity of the plurality of planes, a quantity of the plurality of memory devices, or both is not a power of two, and where each of the plurality of memory devices have the plurality of planes, and where each of the plurality of planes having the plurality of pagelines; and transmitting, to a memory device of the plurality of memory devices based at least in part on receiving the command and determining the logical page address, an indication of a physical address.

Aspect 2: The method, apparatus, or non-transitory computer-readable medium of aspect 1, further including operations, features, circuitry, logic, means, or instructions, or any combination thereof for applying a first function to the logical page address to generate the physical address, where the indication of the physical address is transmitted based at least in part on applying the first function.

Aspect 3: The method, apparatus, or non-transitory computer-readable medium of aspect 2, further including operations, features, circuitry, logic, means, or instructions, or any combination thereof for receiving, from the memory device or another memory device of the plurality of memory devices, a second physical address and applying a second function to the second physical address to generate a second logical page address of the address space.

Aspect 4: The method, apparatus, or non-transitory computer-readable medium of any of aspects 1 through 3, where the address space being consecutive across virtual pages, the plurality of planes, the plurality of memory devices, and the plurality of pagelines includes each virtual page of the address space having an index value immediately subsequent to a respective first virtual page of the address space and immediately preceding a respective second virtual page of the address space, or being a beginning virtual page in an ordering spanning the address space or an ending virtual page in the ordering spanning the address space.

Aspect 5: The method, apparatus, or non-transitory computer-readable medium of any of aspects 1 through 4, where for each virtual page of the address space, the respective first virtual page or the respective second virtual page are each of a same plane as the virtual page, of a different plane for a same memory die as the virtual page, of a different plane for a different memory device for a same pageline as the virtual page, or of a different plane for a different memory device for a different pageline from the virtual page.

Aspect 6: The method, apparatus, or non-transitory computer-readable medium of any of aspects 1 through 5, further including operations, features, circuitry, logic, means, or instructions, or any combination thereof for mapping the logical block address to a physical page address, where the physical page address includes the logical page address.

Aspect 7: The method, apparatus, or non-transitory computer-readable medium of aspect 6, further including operations, features, circuitry, logic, means, or instructions, or any combination thereof for storing a value of the physical page address including the logical page address in a logical to physical address table.

Aspect 8: The method, apparatus, or non-transitory computer-readable medium of any of aspects 1 through 7, further including operations, features, circuitry, logic, means, or instructions, or any combination thereof for compressing a set of physical page addresses in a physical page table, where the set of physical page addresses includes a set of respective logical page addresses, and where at least one logical page address of the set of respective logical page addresses maps to a first memory device of the plurality of memory devices, a first plane of the plurality of planes, or both and at least one other logical page address of the set of respective logical page addresses maps to a second memory device of the plurality of memory devices and distinct from the first memory device, a second plane of the plurality of planes and distinct from the first plane, or both.

Aspect 9: The method, apparatus, or non-transitory computer-readable medium of any of aspects 1 through 8, where the quantity of the plurality of memory devices is equal to eight and the quantity of the plurality of planes is equal to six and the method, apparatuses, and non-transitory computer-readable medium further includes operations, features, circuitry, logic, means, or instructions, or any combination thereof for writing over 128 megabytes of data to one or more of the plurality of memory devices based at least in part on a plurality of commands associated with a plurality of logical block address and compressing a portion of a physical page table associated with a plurality of physical page addresses corresponding to the over 128 megabytes of data based at least in part on the address space being consecutive across the virtual pages, the plurality of planes, the plurality of memory devices, and the plurality of pagelines.

Aspect 10: The method, apparatus, or non-transitory computer-readable medium of any of aspects 1 through 9, where each of the plurality of memory devices is a NOT-AND (NAND) memory device.

FIG. 8 shows a flowchart illustrating a process 800 that supports consecutive logical page address spaces in accordance with examples as disclosed herein. The operations of process 800 may be implemented by a controller or its components as described herein. For example, the operations of process 800 may be performed by a controller as described with reference to FIGS. 1 through 4 and 6. In some examples, a controller may execute a set of instructions to control the functional elements of the device to perform the described functions. Additionally, or alternatively, the wireless controller may perform aspects of the described functions using special-purpose hardware. Aspects of the process 800 may be implemented by a controller among other components. Additionally or alternatively, aspects of the process 800 may be implemented as instructions stored in memory (e.g., firmware stored in a memory coupled with memory system controller 115 and/or memory system controller 215). For example, the instructions, in examples in which the instructions are executed by a controller (e.g., the memory system controller 115 and/or memory system controller 215), may cause the controller to perform the operations of the process 800.

At 805, the method may include receiving, from a host system, a command including an indication of a logical block address. The operations of 805 may be performed in accordance with examples as disclosed herein. In some examples, aspects of the operations of 805 may be performed by an LBA receiver 625 as described with reference to FIG. 6.

At 810, the method may include determining a logical page address based at least in part on the logical block address, where the logical page address is of an address space partitioned into a first portion associated with memory cells each having a first quantity of virtual pages and a second portion associated with memory cells each having a second quantity of virtual pages distinct from the first quantity of virtual pages, and where the address space is consecutive over a boundary between the first portion of the address space and the second portion of the address space. The operations of 810 may be performed in accordance with examples as disclosed herein. In some examples, aspects of the operations of 810 may be performed by an LPA determination component 630 as described with reference to FIG. 6.

At 815, the method may include transmitting, to a memory device of a plurality of memory devices based at least in part on receiving the command and determining the logical page address, an indication of a physical address. The operations of 815 may be performed in accordance with examples as disclosed herein. In some examples, aspects of the operations of 815 may be performed by a physical address transmitter 635 as described with reference to FIG. 6.

In some examples, an apparatus as described herein may perform a method or methods, such as the process 800. The apparatus may include features, circuitry, logic, means, or instructions (e.g., a non-transitory computer-readable medium storing instructions executable by a processor), or any combination thereof for performing the following aspects of the present disclosure:

Aspect 11: A method, apparatus, or non-transitory computer-readable medium including operations, features, circuitry, logic, means, or instructions, or any combination thereof for receiving, from a host system, a command including an indication of a logical block address; determining a logical page address based at least in part on the logical block address, where the logical page address is of an address space partitioned into a first portion associated with memory cells each having a first quantity of virtual pages and a second portion associated with memory cells each having a second quantity of virtual pages distinct from the first quantity of virtual pages, and where the address space is consecutive over a boundary between the first portion of the address space and the second portion of the address space; and transmitting, to a memory device of a plurality of memory devices based at least in part on receiving the command and determining the logical page address, an indication of a physical address.

Aspect 12: The method, apparatus, or non-transitory computer-readable medium of aspect 11, where the address space is further partitioned into a third portion associated with memory cells having a third quantity of virtual pages distinct from the second quantity of virtual pages and the address space is consecutive over a second boundary between the second portion of the address space and the third portion of the address space.

Aspect 13: The method, apparatus, or non-transitory computer-readable medium of aspect 12, where the first quantity is the same as the third quantity.

Aspect 14: The method, apparatus, or non-transitory computer-readable medium of any of aspects 11 through 13, where the address space being consecutive over the boundary includes a first logical page address corresponding to a first virtual page in the first portion of the address space having a value immediately preceding a second logical page address corresponding to a second virtual page in the second portion of the address space.

Aspect 15: The method, apparatus, or non-transitory computer-readable medium of any of aspects 11 through 14, further including operations, features, circuitry, logic, means, or instructions, or any combination thereof for mapping the logical block address to a physical page address, where the physical page address includes the logical page address.

Aspect 16: The method, apparatus, or non-transitory computer-readable medium of any of aspects 11 through 15, where each of the plurality of memory devices is a NOT-AND (NAND) memory device.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 17: An apparatus, including: a plurality of memory devices each having a plurality of planes, and each of the plurality of planes having a plurality of pagelines; and a controller coupled with the plurality of memory devices and configured to: receive, from a host system, a command including an indication of a logical block address; determine a logical page address based at least in part on the logical block address, where the logical page address is of an address space that is consecutive across virtual pages, the plurality of planes, the plurality of memory devices, and the plurality of pagelines, where a quantity of the plurality of planes, a quantity of the plurality of memory devices, or both is not a power of two; and transmit, to a memory device of the plurality of memory devices based at least in part on receiving the command and determining the logical page address, an indication of a physical address.

Aspect 18: The apparatus of aspect 17, where the controller is further configured to: apply a first function to the logical page address to generate the physical address, where the indication of the physical address is transmitted based at least in part on applying the first function.

Aspect 19: The apparatus of aspect 18, where the controller is further configured to: receive, from the memory device or another memory device of the plurality of memory devices, a second physical address; and apply a second function to the second physical address to generate a second logical page address of the address space.

Aspect 20: The apparatus of any of aspects 17 through 19, where the address space being consecutive across virtual pages, the plurality of planes, the plurality of memory devices, and the plurality of pagelines includes each virtual page of the address space having an index value immediately subsequent to a respective first virtual page of the address space and immediately preceding a respective second virtual page of the address space, or being a beginning virtual page in an ordering spanning the address space or an ending virtual page in the ordering spanning the address space.

Aspect 21: The apparatus of aspect 20, where for each virtual page of the address space, the respective first virtual page or the respective second virtual page are each of a same plane as the virtual page, of a different plane for a same memory die as the virtual page, of a different plane for a different memory device for a same pageline as the virtual page, or of a different plane for a different memory device for a different pageline from the virtual page.

Aspect 22: The apparatus of any of aspects 17 through 21, where the controller is further configured to cause the apparatus to: map the logical block address to a physical page address, where the physical page address includes the logical page address.

Aspect 23: The apparatus of aspect 22, where the controller is further configured to: store a value of the physical page address including the logical page address in a logical to physical address table.

Aspect 24: The apparatus of any of aspects 17 through 23, where the controller is further configured to: compress a set of physical page addresses in a physical page table, where the set of physical page addresses includes a set of respective logical page addresses, and where at least one logical page address of the set of respective logical page addresses maps to a first memory device of the plurality of memory devices, a first plane of the plurality of planes, or both and at least one other logical page address of the set of respective logical page addresses maps to a second memory device of the plurality of memory devices and distinct from the first memory device, a second plane of the plurality of planes and distinct from the first plane, or both.

Aspect 25: The apparatus of any of aspects 17 through 24, where the quantity of the plurality of memory devices is equal to eight and the quantity of the plurality of planes is equal to six, the controller further configured to: write over 128 megabytes of data to one or more of the plurality of memory devices based at least in part on a plurality of commands associated with a plurality of logical block address; and compress a portion of a physical page table associated with a plurality of physical page addresses corresponding to the over 128 megabytes of data based at least in part on the address space being consecutive across the virtual pages, the plurality of planes, the plurality of memory devices, and the plurality of pagelines.

Aspect 26: The apparatus of any of aspects 17 through 25, where each of the plurality of memory devices is a NOT-AND (NAND) memory device.

An apparatus is described. The following provides an overview of aspects of the apparatus as described herein:

Aspect 27: An apparatus, including: a plurality of memory devices; and a controller coupled with the plurality of memory devices and configured to: receive, from a host system, a command including an indication of a logical block address; determine a logical page address based at least in part on the logical block address, where the logical page address is of an address space partitioned into a first portion associated with memory cells each having a first quantity of virtual pages and a second portion associated with memory cells each having a second quantity of virtual pages distinct from the first quantity of virtual pages, and where the address space is consecutive over a boundary between the first portion of the address space and the second portion of the address space; and transmit, to a memory device of the plurality of memory devices based at least in part on receiving the command and determining the logical page address, an indication of a physical address.

Aspect 28: The apparatus of aspect 27, where the address space is further partitioned into a third portion associated with memory cells having a third quantity of virtual pages distinct from the second quantity of virtual pages, and the address space is consecutive over a second boundary between the second portion of the address space and the third portion of the address space.

Aspect 29: The apparatus of aspect 28, where the first quantity is the same as the third quantity.

Aspect 30: The apparatus of any of aspects 27 through 29, where the address space being consecutive over the boundary includes a first logical page address corresponding to a first virtual page in the first portion of the address space having a value immediately preceding a second logical page address corresponding to a second virtual page in the second portion of the address space.

Aspect 31: The apparatus of any of aspects 27 through 30, where the controller is further configured to cause the apparatus to: map the logical block address to a physical page address, where the physical page address includes the logical page address.

Aspect 32: The apparatus of any of aspects 27 through 31, where each of the plurality of memory devices is a NOT-AND (NAND) memory device.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
a plurality of memory devices each having a plurality of planes, and each of the plurality of planes having a plurality of pagelines; and
one or more controllers coupled with the plurality of memory devices and configured to cause the memory system to:
receive a command comprising an indication of a logical block address;
determine a logical page address based at least in part on the logical block address, wherein the logical page address is of an address space that is consecutive across virtual pages, the plurality of planes, the plurality of memory devices, and the plurality of pagelines, wherein a quantity of the plurality of planes, a quantity of the plurality of memory devices, or both is not a power of two; and
transmit, based at least in part on receiving the command and determining the logical page address, an indication of a physical address.

2. The memory system of claim 1, wherein the one or more controllers are further configured to cause the memory system to:
apply a first function to the logical page address to generate the physical address, wherein the indication of the physical address is transmitted based at least in part on applying the first function.

3. The memory system of claim 2, wherein the one or more controllers are further configured to cause the memory system to:
receive a second physical address; and
apply a second function to the second physical address to generate a second logical page address of the address space.

4. The memory system of claim 1, wherein the address space being consecutive across virtual pages, the plurality of planes, the plurality of memory devices, and the plurality of pagelines comprises each virtual page of the address space having an index value immediately subsequent to a respective first virtual page of the address space and immediately preceding a respective second virtual page of the address space, or being a beginning virtual page in an ordering spanning the address space or an ending virtual page in the ordering spanning the address space.

5. The memory system of claim 4, wherein for each virtual page of the address space, the respective first virtual page or the respective second virtual page are each of a same plane as the virtual page, of a different plane for a same memory device as the virtual page, of a different plane for a different memory device for a same pageline as the virtual page, or of a different plane for a different memory device for a different pageline from the virtual page.

6. The memory system of claim 1, wherein the one or more controllers are further configured to cause the memory system to:
map the logical block address to a physical page address, wherein the physical page address comprises the logical page address.

7. The memory system of claim 6, wherein the one or more controllers are further configured to cause the memory system to:
store a value of the physical page address comprising the logical page address in a logical to physical address table.

8. The memory system of claim 1, wherein the one or more controllers are further configured to cause the memory system to:
compress a set of physical page addresses in a physical page table, wherein the set of physical page addresses comprises a set of respective logical page addresses, and wherein at least one logical page address of the set of respective logical page addresses maps to a first memory device of the plurality of memory devices, a first plane of the plurality of planes, or both and at least one other logical page address of the set of respective logical page addresses maps to a second memory device of the plurality of memory devices and distinct from the first memory device, a second plane of the plurality of planes and distinct from the first plane, or both.

9. The memory system of claim 1, wherein the quantity of the plurality of memory devices is equal to eight and the quantity of the plurality of planes is equal to six, and wherein the one or more controllers are further configured to cause the memory system to:
write over 128 megabytes of data based at least in part on a plurality of commands associated with a plurality of logical block address; and
compress a portion of a physical page table associated with a plurality of physical page addresses corresponding to the over 128 megabytes of data based at least in part on the address space being consecutive across the virtual pages, the plurality of planes, the plurality of memory devices, and the plurality of pagelines.

10. The memory system of claim 1, wherein each of the plurality of memory devices is a NOT-AND (NAND) memory device.

11. A memory system, comprising:
a plurality of memory devices; and
one or more controllers coupled with the plurality of memory devices and configured to cause the memory system to:
receive a command comprising an indication of a logical block address;
determine a logical page address based at least in part on the logical block address, wherein the logical page address is of an address space partitioned into a first portion associated with memory cells each having a first quantity of virtual pages and a second portion associated with memory cells each having a second quantity of virtual pages distinct from the first quantity of virtual pages, and wherein the address space is consecutive over a boundary between the first portion of the address space and the second portion of the address space; and transmit, based at least in part on receiving the command and determining the logical page address, an indication of a physical address.

12. The memory system of claim 11, wherein the address space is further partitioned into a third portion associated with memory cells having a third quantity of virtual pages distinct from the second quantity of virtual pages, and the address space is consecutive over a second boundary between the second portion of the address space and the third portion of the address space.

13. The memory system of claim 12, wherein the first quantity is the same as the third quantity.

14. The memory system of claim 11, wherein the address space being consecutive over the boundary comprises a first logical page address corresponding to a first virtual page in the first portion of the address space having a value immediately preceding a second logical page address corresponding to a second virtual page in the second portion of the address space.

15. The memory system of claim 11, wherein the one or more controllers are further configured to cause the memory system to:

map the logical block address to a physical page address, wherein the physical page address comprises the logical page address.

16. The memory system of claim 11, wherein each of the plurality of memory devices is a NOT-AND (NAND) memory device.

17. A non-transitory computer-readable medium storing code comprising instructions which, when executed by one or more processors of an electronic device, cause the electronic device to:

receive a command comprising an indication of a logical block address;

determine a logical page address based at least in part on the logical block address, wherein the logical page address is of an address space that is consecutive across virtual pages, a plurality of planes, a plurality of memory devices, and a plurality of pagelines, wherein a quantity of the plurality of planes, a quantity of the plurality of memory devices, or both is not a power of two, and wherein each of the plurality of memory devices have the plurality of planes, and wherein each of the plurality of planes having the plurality of pagelines; and transmit, based at least in part on receiving the command and determining the logical page address, an indication of a physical address.

18. The non-transitory computer-readable medium of claim 17, wherein the address space being consecutive across virtual pages, the plurality of planes, the plurality of memory devices, and the plurality of pagelines comprises each virtual page of the address space having an index value immediately subsequent to a respective first virtual page of the address space and immediately preceding a respective second virtual page of the address space, or being a beginning virtual page in an ordering spanning the address space or an ending virtual page in the ordering spanning the address space.

19. The non-transitory computer-readable medium of claim 18, wherein for each virtual page of the address space, the respective first virtual page or the respective second virtual page are each of a same plane as the virtual page, of a different plane for a same memory device as the virtual page, of a different plane for a different memory device for a same pageline as the virtual page, or of a different plane for a different memory device for a different pageline from the virtual page.

20. The non-transitory computer-readable medium of claim 18, wherein the instructions, when executed by the one or more processors of the electronic device, cause the electronic device to map the logical block address to a physical page address, wherein the physical page address comprises the logical page address.

* * * * *